(12) United States Patent
DiChiara, Jr.

(10) Patent No.: US 12,007,175 B2
(45) Date of Patent: Jun. 11, 2024

(54) THERMAL TRANSFER BLANKET SYSTEM

(71) Applicant: The Boeing Company, Chicago, IL (US)

(72) Inventor: Robert A. DiChiara, Jr., Carlsbad, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/444,572

(22) Filed: Aug. 6, 2021

(65) Prior Publication Data
US 2022/0120512 A1 Apr. 21, 2022

Related U.S. Application Data

(60) Provisional application No. 63/094,311, filed on Oct. 20, 2020.

(51) Int. Cl.
| | |
|---|---|
| F28D 17/00 | (2006.01) |
| B29C 73/34 | (2006.01) |
| F28D 20/00 | (2006.01) |
| B29L 31/30 | (2006.01) |

(52) U.S. Cl.
CPC .......... *F28D 20/0056* (2013.01); *B29C 73/34* (2013.01); *B29L 2031/3076* (2013.01); *F28D 2020/0017* (2013.01); *F28D 2020/0021* (2013.01); *F28D 2020/0026* (2013.01)

(58) Field of Classification Search
CPC ............. B09C 73/34; B29L 2031/3076; F28D 20/0056; F28D 2020/0017; F28D 2020/0021; F28D 2020/0026

USPC .......................................................... 165/10
See application file for complete search history.

(56) References Cited

U.S. PATENT DOCUMENTS

| | | | |
|---|---|---|---|
| 5,374,388 A | 12/1994 | Frailey | |
| 5,395,478 A | 3/1995 | Sattler et al. | |
| 5,637,389 A * | 6/1997 | Colvin | A43B 7/34 |
| | | | 2/5 |
| 6,270,603 B1 | 8/2001 | Westerman et al. | |
| 8,533,128 B1 * | 9/2013 | Ciaciuch | E06B 9/582 |
| | | | 705/412 |
| 9,914,269 B2 | 3/2018 | Hopkins et al. | |
| 10,155,366 B2 | 12/2018 | Whitworth et al. | |
| 10,213,969 B2 | 2/2019 | Hopkins et al. | |
| 10,336,013 B2 | 7/2019 | Kestner et al. | |

(Continued)

FOREIGN PATENT DOCUMENTS

| | | | |
|---|---|---|---|
| BR | PI0603559 A * | 4/2008 | |
| CN | 2105163 U * | 5/1992 | |

(Continued)

OTHER PUBLICATIONS

Wikipedia, "Chromate conversion coating," https://en.wikipedia.org/wiki/Chromate_conversion_coating, downloaded Feb. 10, 2020, 5 pages.

(Continued)

*Primary Examiner* — Davis D Hwu
(74) *Attorney, Agent, or Firm* — MH2 Technology Law Group LLP (57) ABSTRACT

A thermal transfer blanket includes a flexible container comprising a thermally insulating material. A thermal energy storage media is disposed within the flexible container.

20 Claims, 8 Drawing Sheets

(56) References Cited

U.S. PATENT DOCUMENTS

| | | | |
|---|---|---|---|
| 2003/0060107 A1* | 3/2003 | Gooliak | B32B 15/02 |
| | | | 442/178 |
| 2003/0124278 A1* | 7/2003 | Clark | E04B 1/7662 |
| | | | 428/35.7 |
| 2004/0091736 A1 | 5/2004 | Dichiara, Jr. | |
| 2007/0067910 A1 | 3/2007 | Augustine et al. | |
| 2011/0139344 A1 | 6/2011 | Watson et al. | |
| 2020/0023596 A1 | 1/2020 | Hopkins et al. | |
| 2021/0039329 A1 | 2/2021 | Dichiara et al. | |
| 2021/0039333 A1 | 2/2021 | Dichiara et al. | |

FOREIGN PATENT DOCUMENTS

| | | | |
|---|---|---|---|
| CN | 201282882 Y | * | 8/2009 |
| CN | 108605422 A | * | 9/2018 |
| CN | 110001016 A | | 7/2019 |
| DE | 529560 C | | 7/1931 |
| DE | 202011107576 U1 | * | 11/2011 |
| EP | 2148337 A1 | | 1/2010 |
| EP | 3203038 A1 | * | 8/2017 |
| EP | 3531798 A1 | | 8/2019 |
| GB | 2477850 A | | 8/2011 |
| WO | WO2015112511 A1 | * | 7/2015 |
| WO | 2017183770 A1 | | 10/2017 |

OTHER PUBLICATIONS

"Care and Repair of Advanced Composites, Second Edition," https://app.knovel.com/web/view/khtml/print.v/rcid:kpCRACE001/cid:k, downloaded on May 13, 2020, 3 pages.

"Structural Repair Manual (SRM) Repair Method Selection," date unknown, pp. 263-264.

Extended European Search Report dated Mar. 21, 2022 in related European Application No. 21203684.2, 11 pages.

* cited by examiner

THERMAL TRANSFER BLANKET SYSTEM

CROSS REFERENCE TO RELATED APPLICATIONS

This patent application claims the benefit of U.S. Provisional Application No. 63/094,311, filed Oct. 20, 2020, the disclosure of which is incorporated herein by reference in its entirety.

DETAILED DESCRIPTION

Field of the Disclosure

The present disclosure is directed to a thermal transfer blanket that can be employed for heating or cooling objects.

BACKGROUND

Coatings, sealants, and composite structures of laminated material are increasingly being used in industry, and, particularly, in the aircraft industry. From time to time, the coatings, sealants and composite structures will be damaged and need repair in the field rather than replacement of an entire panel or subassembly. Repair typically involves the removal of damaged material and covering the repair site with organic resin or layers of woven material, such as graphite or carbon fiber, which have been impregnated with an organic matrix resin, such as epoxy. The repairs need to be cured and it some cases pressed and cure at elevated temperatures. When correctly done, such curing involves a controlled heating profile to a predetermined temperature, which is held for a sufficient time to complete the resin's curing reaction followed by a slow cooling profile.

The advantages of designing with composite materials include the ability to tailor the amount of material used to obtain efficient structural components. Many composite designs have been developed that have non-uniform cross-sections (e.g., ply drop-offs, planks, stiffening elements, etc.). The heat sinks from these non-uniform cross-sections require increased thermal control to maintain uniform cures. Curing of resins used in composite materials (including those in repair patches) is an exothermic reaction that requires heat to start the reaction. Without adequate control of the heating or cooling, hot spots or cold spots develop in the repair. Conventional heat blankets and control techniques that seek to reduce cold spots tend to increase problems associated with hot spots or vice versa. Existing portable repair equipment has neither the desired elevated pressures nor the inherent temperature control capabilities of an autoclave. Consequently, repairs to complex structures are often inadequate because of poor temperature control and non-uniform temperatures in the repair zone, thereby reducing the quality or structural capability of the repair.

Controlling the pressure applied and the temperature profile for a repair is desirable as these can affect the strength of a repair. Inadequate temperature control can substantially impact repair strength. Heating too fast can shock and weaken the composite structure. Curing temperatures lower than desired result in poor bonding and temperatures higher than desired can result in burning both the repair patch and the material surrounding the repair. Fluctuating temperatures, especially during the cure, can produce a combination of these effects.

Curing of organic resin repairs is typically done with electronic heater blankets, IR lamps or electrical convection heaters. Electric heater blankets are the most common approach. However, heater blankets can have problems with non-uniform heating, which can be compounded with the underlying repair site having variations of thickness and spar locations. Monitoring the temperature of the repair site and controlling the power supply to the heater in response to follow a profile or maintain relatively constant temperature to cure the resin without local hot and cold spots can be challenging. This can be especially true in cold environments where the electrical blanket controller can continually attempt to maintain temperature and drive heat into the surrounding structure, thereby unintentionally overheating and potentially thermally damaging underlying layers.

Additionally, there is sometimes a need to heat and cure resin coatings for infield repair on composite objects, such as the exterior of aircraft, without a power supply. While an open flame heater may work, open flame heaters are typically not allowed near aircraft, are bulky, and provide uneven heating.

SUMMARY

The present disclosure is directed to a thermal transfer blanket. The thermal transfer blanket comprises a flexible container comprising a thermally insulating material. A thermal energy storage media is disposed within the flexible container.

The present disclosure is also directed to a thermal resistive pad. The thermal resistive pad comprises a thermal insulating material. A shell layer surrounds the thermal insulating material, the shell layer being a fabric. A thermocouple is proximate the shell layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The devices of the present disclosure can provide the ability to repair, for example, coatings, sealants and/or thermal set composites on the exterior of vehicles, for example aircraft, or other objects in very austere environments with few tools and no electrical power. For example, the devices can heat adhesive, sealant, prepreg or other organic resin-containing repair materials to achieve a reasonable temperature to cure the organic resin at high temperatures, such as, for example, 120° F. or above. The devices are easily portable and can be used to repair coatings outside and in situations where the resin is initially at low temperatures, such as 20° F. or lower. The devices of the present disclosure can also function as non-powered hot or cold storage device that can be used to heat or cool various items from, for example, about −65° F. to about 1,700° F., about 120° F. to about 1200° F., or about 120° F. to about 600° F.

Figure 1:
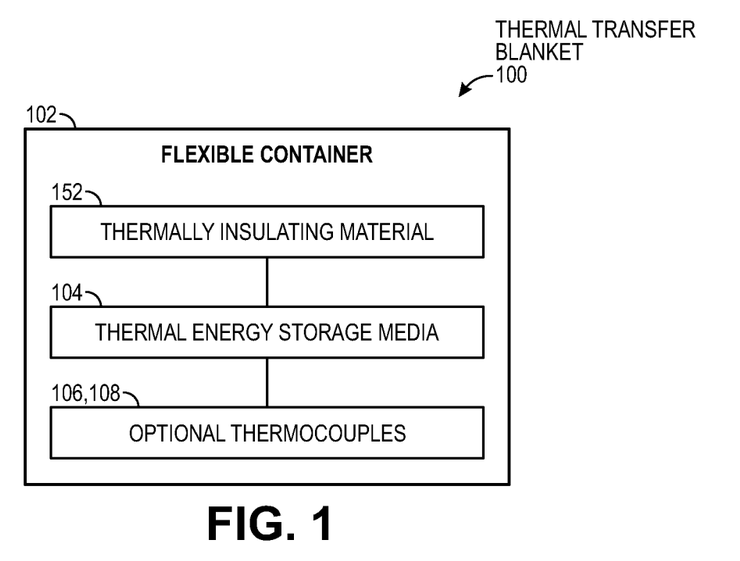
FIG. 1 illustrates a block diagram of a thermal transfer blanket, according to an example of the present disclosure.

FIG. 1 illustrates a block diagram of a thermal transfer blanket 100. Thermal transfer blanket 100 comprises a flexible container 102 comprising a thermally insulating material 152. A thermal energy storage media 104 is disposed within the flexible container 102. One or more thermocouples are optionally in thermal communication with the thermal energy storage media 104.

Figure 2:
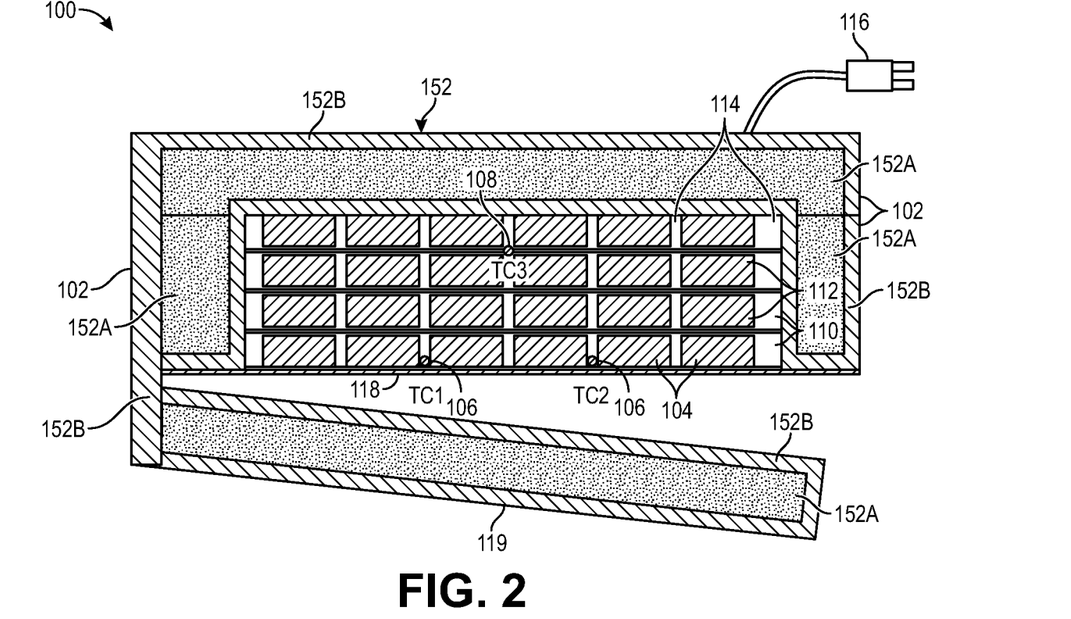
FIG. 2 illustrates a schematic, cross-sectional side view of a thermal transfer blanket, according to an example of the present disclosure.

The flexible container 102 can comprise any suitable thermal insulating material 152 described herein. The thermal insulating material maintains thermal energy within the thermal energy storage media 104 so as to reduce unwanted heat loss, as well as to protect users from burns that could occur by touching the thermal energy storage media 104. FIG. 2 shows an example of suitable thermal insulating materials 152 that include a ceramic batting 152A that can withstand process temperatures of up to 1700° F. or higher, such as alumina batting. A layer of fabric 152B comprising glass, such as fiberglass, surrounds the ceramic batting 152A. Other examples of thermally insulating materials 152 include foam insulation that can withstand process temperatures to which the container will be exposed, such as, for example, temperatures ranging from about 300° F. or more, such as about 300° F. to about 600° F., or about 300° F. to about 450° F. Examples of such foam insulating materials include foams comprising silicone.

The thermal energy storage media 104 comprises a material that acts as a heat sink for storing and releasing thermal energy. Suitable materials can comprise, for example, at least one material chosen from metal oxide or non-oxide ceramics, such as AlN, BeO, BN (either cubic BN or hexagonal BN), diamond, $Al_2O_3$, and metals, such as aluminum, copper, silver, brass, iron, gold, steel and combinations thereof, with aluminum, silver and copper having the most suitable combinations of thermal conductivities and specific heat capacities. The metals, such as aluminum, copper, silver, gold and iron, can be pure or alloyed. The term "pure" is defined to mean at least 99% by weight pure. Thus, "pure aluminum" as used herein includes at least 99% by weight aluminum. The thermal conductivities and specific heat capacities of several of these materials are shown Table 1 below. Materials such as AlN, BN and BeO, which have relatively high thermal conductivities and specific heat capacities will be able to store relatively large amounts of thermal energy per unit mass, while also being capable of transferring the thermal energy quickly, either for purposes of storing or releasing the thermal energy. Examples of suitable thermal conductivities range from about 35 W/m-K to about 500 W/m-K or higher, such as about 100 W/m-K to about 500 W/m-K, such as about 150 W/m-K to about 400 W/m-K, or about 200 W/m-K to about 400 W/m-K (as measured at 25° C.). Examples of suitable specific heat capacities range from about 300 J/kg·K to about 1500 J/kg·K or higher, such

TABLE 1

| THERMAL PROPERTIES | AlN | BeO | Al2O3 | Al METAL | Cu METAL | Au METAL |
|---|---|---|---|---|---|---|
| THERMAL CONDUCTIVITY (W/m-K) | 170-200 | 209-330 | 35 | 204 | 386 | 310 |
| SPECIFIC HEAT CAPACITY (J/kg · K) | 740 | 750-1020 | 880 | 902 | 385 | 129 |
| DIELECTRIC CONSTANT | 9.7 | 6.1-7.5 | | | | | as about 500 J/kg·K to about 1000 J/kg·K, or about 700 J/kg·K to about 950 J/kg·K (as measured at 25° C.). It is possible that materials with lower thermal conductivities (e.g., $Al_2O_3$) and/or lower specific heat capacities (e.g., gold) can be used, but they will not function as effectively for quickly charging the thermal blanket, quickly delivering heat energy or quickly cooling an object and/or for providing a desired amount of heat energy to the object. In the case where a longer time period for charging of the thermal blanket is not an issue and/or where it is desirable to deliver the heat or cold for long periods of time without too quickly reducing the thermal blanket, a material with a high specific heat and a low thermal conductivity could be desirable. For example, while $Al_2O_3$ has a suitable specific heat, its thermal conductivity is only about 35 W/m-K, and so it is not as good a candidate as AlN, BN or BeO for quickly charging and quick heating and/or cooling. However, $Al_2O_3$ may be suitable for other applications where longer periods of time for charging, heating and/or cooling are acceptable. Additionally, these and the other ceramics listed are electrical insulators, which is an advantage in situations where electrical conductivity is an issue. Of the metals shown in FIG. 2, aluminum has a thermal conductivity of over 200 W/m-K and the highest specific heat capacity, and will therefore be capable of both storing the most heat per unit mass and transferring the heat relatively quickly. In addition, pure aluminum resists oxidation corrosion well and has a relatively high melting point of over 1200° F., allowing it to withstand high processing temperatures. An example of a commercially available material is SHAPAL HI-M SOFT™, made by Tokuyama Corporation of Tokyo, Japan, which is a hybrid combination of AlN and BN, and which is easily machined into complex shapes and therefore will potentially have advantages for some designs.

Figure 3:
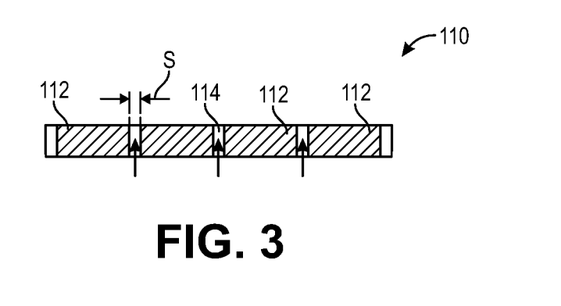
FIG. 3 shows a schematic, cross-sectional side view of a layer of tiles bonded together by an elastomeric polymer that can be used as thermal energy storage media, according to an example of the present disclosure.
Figure 4:
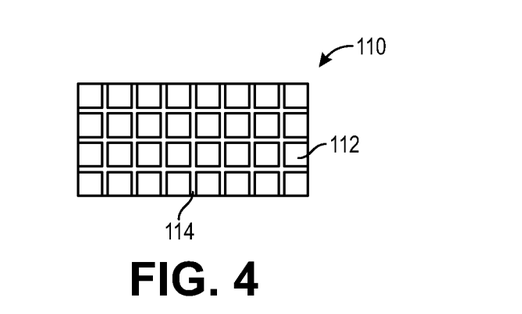
FIG. 4 shows a schematic, angled top-down view of a layer of tiles bonded together by an elastomeric polymer that can be used as thermal energy storage media, according to an example of the present disclosure.

The thermal energy storage media 104 employed in the thermal transfer blanket 100 of FIG. 2 comprises at least one layer 110 of tiles 112. The tiles 112 in each layer 110 are spaced apart and bonded together by an elastomeric polymer 114. Referring to FIG. 3, the spacing, S, between the tiles 112 within the same layer can range, for example, from about 0.02 inch to about 0.1 inch, such as about 0.04 inch to about 0.08 inch. FIG. 4 shows an angled top down view of an example of a layer 110. Spacing the tiles relatively close together can increase the packing density of the tiles, thereby increasing the amount of thermal energy that can be stored by each layer 110. On the other hand, spacing the tiles too close together may reduce the flexibility of the layer 110, which may in turn, reduce the flexibility of the thermal transfer blanket 100.

The elastomeric polymer 114 can be any polymer that is flexible and can withstand relatively high temperatures of at least 120° F., such as about 300° F. or more, such as about 400° F. to about 650° F. An example of such an elastomeric polymer is silicone. An example of a commercially available silicone is 3145 RTV, available from Dow Corning of Midland, Michigan.

The thermal transfer blanket 100 can comprise any desired number of layers 110 of the thermal energy storage media 104. For example, thermal transfer blanket 100 can comprise about 1 to about 10 of the layers 110, such as about 2 to about 6 of the layers 110. The number of layers can be chosen to provide a desired amount of thermal energy storage capacity for the thermal transfer blanket 100 and the thickness of the layers 110. The thickness of each layer 110 can be any suitable thickness, such as about 0.1 inch to about 1 inch, or about 0.15 inch to about 0.25 inch, or about 0.0157 inch. The thicker the layers 110 are, the fewer that may be used to achieve a desired thermal energy storage capacity. However, using larger numbers of thin layers can provide for a more flexible thermal transfer blanket than using fewer numbers of thicker layers to achieve the same thermal energy storage capacity.

The layers 110 can be attached to the thermal transfer blanket in any suitable manner. For example, the layers 110 can be attached to the flexible container 102 using an adhesive, such as silicone, at an end of each of the layers 110. In an example, the two or more layers 110 of tiles 112 are not attached directly to each other, thereby providing increased flexibility for the thermal transfer blanket 100.

In an alternative example, the layers 110 can be allowed to float freely within the flexible container 102. In this example, thermally transparent layer 118 can act to enclose and retain the layers 110 within the flexible container 102. The thermally transparent layer 118 can be in direct thermal communication with the thermal energy storage media 104. Thermally transparent layer 118 is made of a material that can allow the thermal energy stored in the thermal energy storage media 104 to be released through the thermally transparent layer 118. For example, the thermally transparent layer 118 can be sufficiently thin (e.g., 0.001 inch to 0.01 inch thick, such as about 0.005 inch thick) so as to allow ready transfer of heat therethrough. If desired, the thermally transparent layer 118 can also be non-stick in order to avoid sticking to the object being heated or cooled. A commercial example of such a non-stick material is ARMALON®, which is a non-porous TEFLON (a polytetrafluoroethylene) coated fiberglass fabric that is known for use in composite fabrication.

In an example, the thermal transfer blankets described herein include at least one thermocouple. For instance, thermocouples 106, 108 can be arranged as shown in FIG. 2. One or more thermocouples 106 are positioned proximate an outer surface of the thermal energy storage media 104 to measure the temperature proximate the outer surface, which can provide data approximating the temperature at a repair patch surface as an example. One or more thermocouples 108 are positioned within the thermal energy storage media 104 away from the outer surface to measure the temperature within the inner volume of the thermal storage media 104. The data provided by the thermocouples can be useful for monitoring the surface temperatures of the object being heated or cooled, as well as for providing feedback as to when the thermal energy storage media 104 is sufficiently charged with thermal energy, or alternatively, when the thermal energy stored within the thermal energy storage media 104 is fully discharged. For example, collected data of the temperature difference between thermocouples 106 and 108 over time can be used to calculate heating rate, predict thermal energy charge times and can be used for monitoring the temperature at the interface and within the device for the amount of heat or cold storage remaining. A thermocouple plug 116 can be used to connect the thermocouples to a device (not shown), such as a handheld computer as an example, for calculating outputs based on the data and displaying the outputs to a user.

Figure 15:
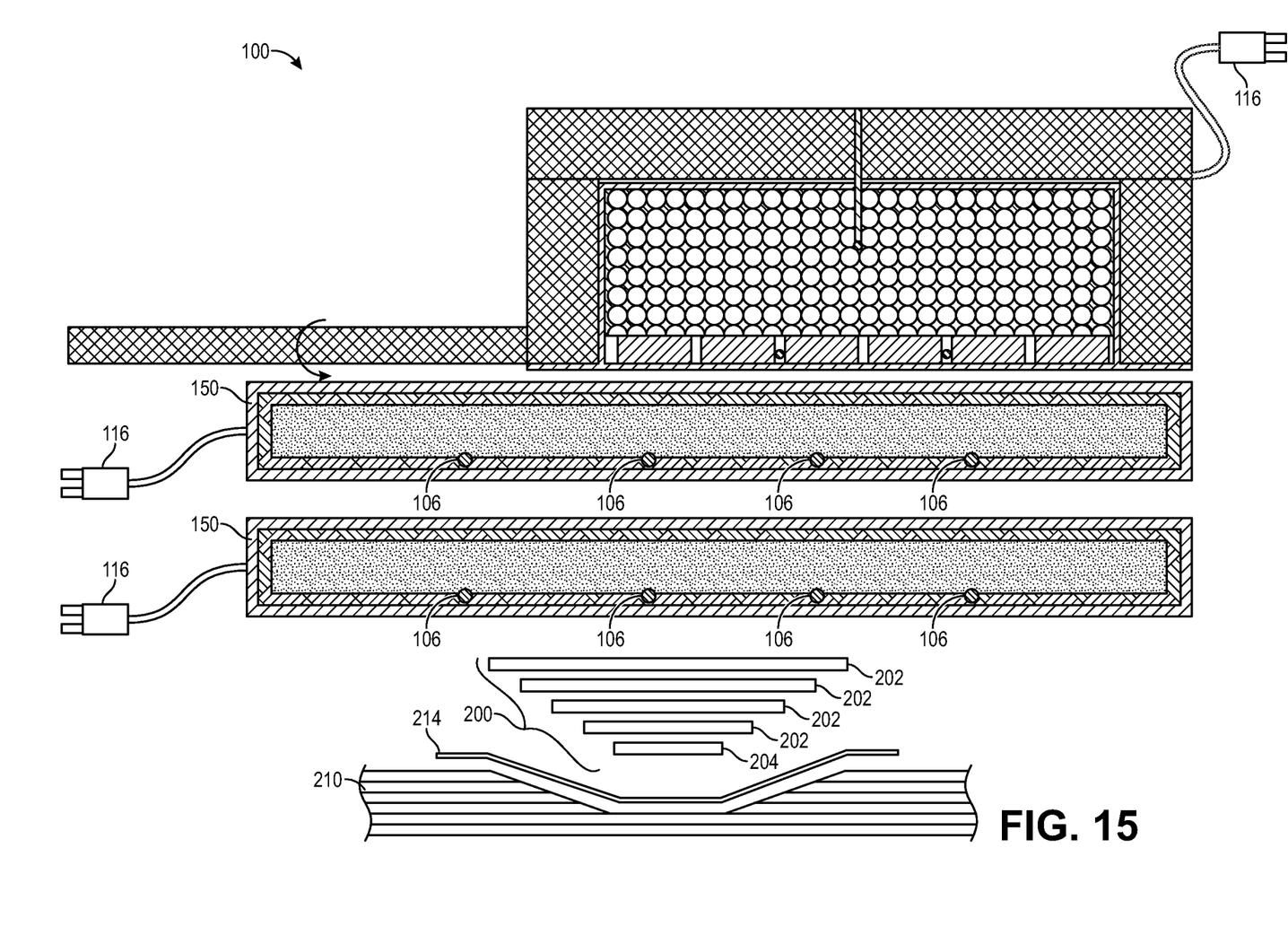
FIG. 15 illustrates a schematic, cross-sectional side view of a thermal transfer blanket and two thermal resistive pads being used to cure a repair patch on an object, according to an example of the present disclosure.

FIG. 2 further illustrates a heat storage flap 119 that can optionally be attached to the flexible container 102 of the thermal transfer blanket 100. Heat storage flap 119 can comprise a thermal insulation material, such as any of the thermal insulation materials taught herein for flexible container 102. Heat storage flap can be opened, as illustrated in FIG. 15, when the thermal transfer blanket 100 is being charged with thermal energy and/or is being used to heat an object. When desired, heat storage flap 119 can be closed so as to cover the thermally transparent layer 118 and/or the thermal energy storage media 104, thereby fully enclosing the thermal energy storage media 104 within the insulated enclosure of flexible container 102 and heat storage flap 119 so as to more efficiently maintain thermal energy within the thermal energy storage media 104.

Figure 5:
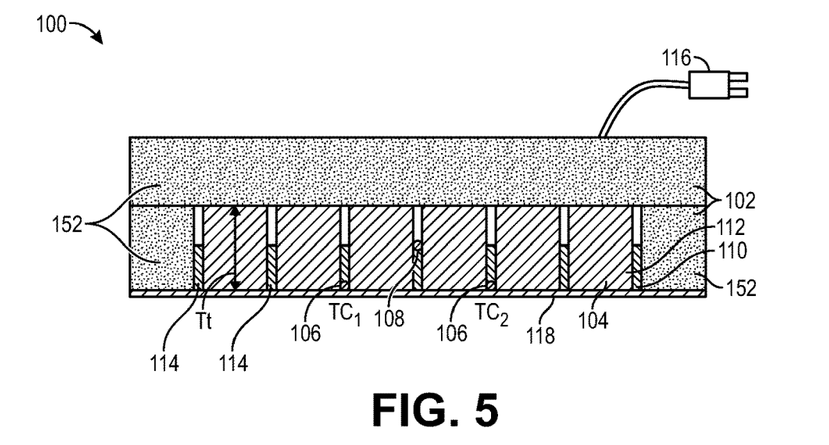
FIG. 5 illustrates a schematic, cross-sectional side view of a thermal transfer blanket, according to an example of the present disclosure.

FIG. 5 illustrates another example of a thermal transfer blanket 100 that is similar to that of FIG. 2. Thermal transfer blanket 100 of FIG. 5 comprises a flexible container 102 comprising a thermally insulating material 152, which can be the same as any of the thermally insulating materials 152 described herein. Thermal energy storage media 104 is disposed within the flexible container 102. The thermocouples 106 and/or 108 can optionally be employed, similarly as described above for the thermal transfer blanket FIG. 2. An optional thermally transparent layer 118 can be employed, as also described herein for the thermal transfer blanket of FIG. 2.

The thermal transfer blanket 100 of FIG. 5 can be the same as that of FIG. 2, with the exception that only a single layer 110 comprising tiles 112 is employed. The tiles 112 are sized to provide the desire energy storage for the blanket without the need for employing additional layers 110. For example, tiles 112 can have a thickness, $T_t$, ranging from about 0.3 inch to about 1 inch, such as about 0.5 inch to about 0.8 inch. An elastomeric polymer 114 is used to bond the tiles 112, similarly as described for the layers 110 of FIG. 2. The material used for the tiles 112 and elastomeric polymer 114 can be the same as those described above for FIG. 2. In an example, as illustrated by the thermal transfer blanket 100 of FIG. 5, the elastomeric polymer 114 is only disposed on a portion of the sides between tiles 112, as shown in FIG. 5, so as to provide increased flexibility. For example, the elastomeric polymer 114 may cover only about 10% to about 80%, such as about 20% to about 60%, of the sides between tiles 112.

Figure 6:
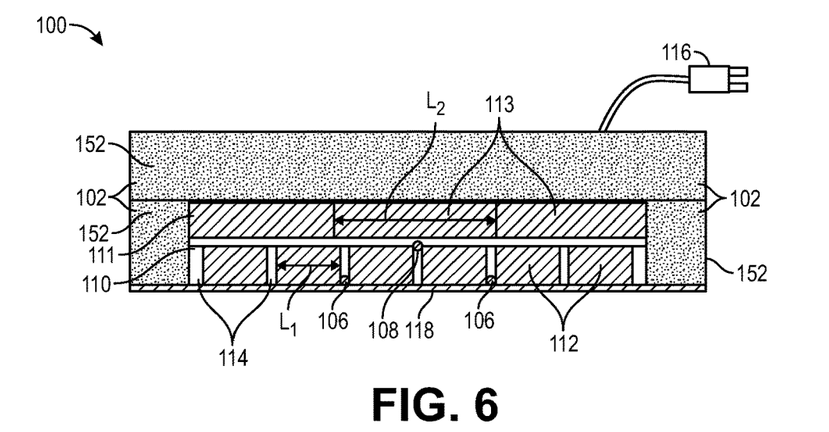
FIG. 6 illustrates a schematic, cross-sectional side view of a thermal transfer blanket, according to an example of the present disclosure.

FIG. 6 illustrates a thermal transfer blanket 100 that is similar to that of FIG. 2. Thermal transfer blanket 100 of FIG. 6 comprises a flexible container 102 comprising a thermally insulating material 152, which can be the same as any of the thermally insulating materials 152 described herein. Thermal energy storage media 104 is disposed within the flexible container 102. The thermocouples 106 and/or 108 can optionally be employed, similarly as described above for the thermal transfer blanket FIG. 2. An optional thermally transparent layer 118 can be employed, as also described herein for the thermal transfer blanket of FIG. 2.

The thermal transfer blanket 100 of FIG. 6 can be the same as that of FIG. 2, with the exception that the tiles comprise at least one layer 110 having tiles 112 of a first length, $L_1$, and at least one layer 111 having tiles 113 of a second length, $L_2$, that is longer than the first length. For example, layer 111 can be a single tile that is the entire length of layer 111, or may have a plurality of tiles 113 that are 1.5 to 4 times, such as 2 to 3 times, longer than the tiles 112. Any spacing between the tiles 113 can be less than or the same as the spacing, S, between the tiles 112. Due to the increased length of tiles 113, layer 111 has an increased thermal energy storage capacity compared to layer 110, but will also have a reduced flexibility compared to layer 110. The use of multiple tile sizes can provide a range of combinations of thermal energy storage capacity and flexibility for the thermal transfer blanket 100 of FIG. 6. An elastomeric polymer 114 is used to adhere the tiles 112 together in layer 110, and tiles 113 together in layer 111, similarly as described for the layer 110 of FIG. 2. The tiles 112, 113 and elastomeric polymer 114 can comprise the same materials as those described above for the tiles 112 and elastomeric polymer 114 of FIG. 2.

Figure 7:
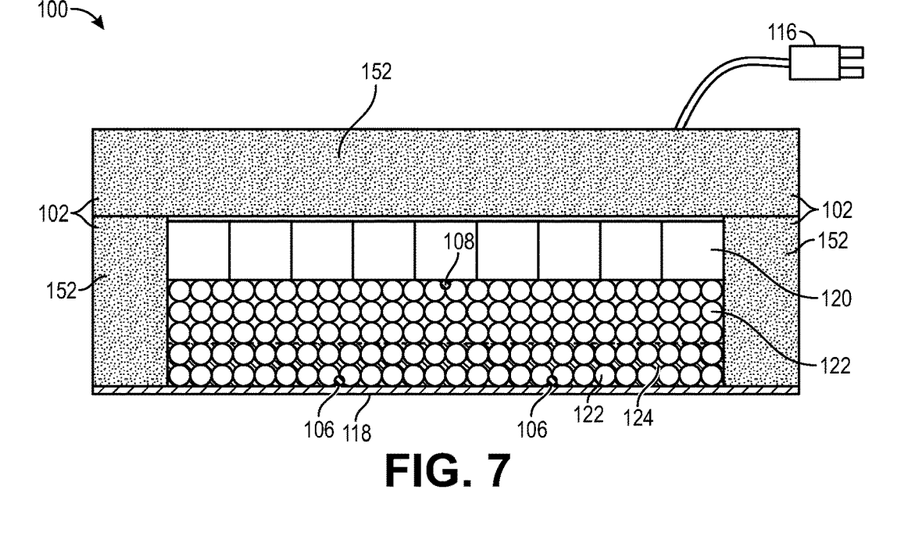
FIG. 7 illustrates a schematic, cross-sectional side view of a thermal transfer blanket, according to an example of the present disclosure.

FIG. 7 illustrates a thermal transfer blanket 100 that is similar to that of FIG. 2. Thermal transfer blanket 100 of FIG. 7 comprises a flexible container 102 comprising a thermally insulating material 152, which can be the same as any of the thermally insulating materials 152 described herein. One or more thermocouples 106, 108 can also optionally be employed, similarly as described above for the thermal transfer blanket FIG. 2. An optional thermally transparent layer 118 can be employed, as also described herein for the thermal transfer blanket of FIG. 2.

The thermal transfer blanket 100 of FIG. 7 can be the same as that of FIG. 2, with the exception that instead of at least one layer 110 having tiles 112, the thermal energy storage media 104 comprises an optional plate 120 and pellets 122. The benefits of the plate 120 and pellets 122 are discussed below. Both the plate 120 and pellets 122 are made of a material that acts as a heat sink for storing and releasing thermal energy. At least a portion of the pellets 120 are in a matrix material 124, such as an elastomeric polymer. The benefits of the matrix material are discussed below. The pellets 122 can be spherical or have an irregular shape. As mentioned above, the plate 120 is optional, as is the matrix material 124, so that the thermal energy storage media 104 can comprise the pellets 122 alone, or the pellets 122 and matrix material 124 without the plate 120.

The plate 120 and pellets 122 can comprise any of the materials described herein for thermal energy storage 104. For example, plate 120 and pellets 122 can comprise at least one material chosen from AlN, BeO, BN, diamond, $Al_2O_3$, and metals, such as aluminum, copper, silver, gold, brass, iron, steel and combinations thereof. In an example, both the plate 120 and pellets 122 comprise aluminum, such as pure aluminum. The pellets 122 can be coated or uncoated. In an example, the pellets 122 are coated with a chromate conversion coating for reducing corrosion and/or hardening the pellet surface. Corrosion can reduce heat transferability so that reducing corrosion can be desirably for maintaining the heat transfer efficiency of the pellets. One example of a commercially available chromate conversion coating is BONDERITE® (formerly known as ALODINE®), from Henkel Adhesives of Düsseldorf, Germany.

Figure 11:
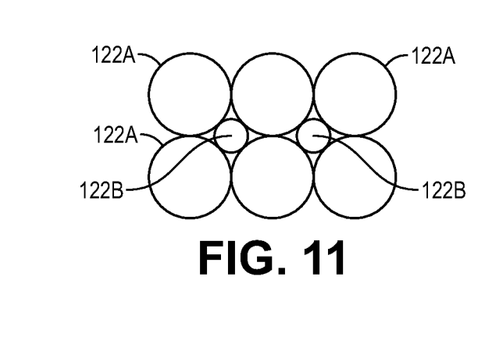
FIG. 11 shows a schematic view of a bimodal configuration of pellets that can be used as thermal energy storage media, according to an example of the present disclosure.

The pellets 122 can have a uniform size. Alternatively, the pellets 122 can comprise a plurality of sizes so as to improve packing density, and therefore increase the amount of thermal energy that can be stored per unit volume of the pellets, which can be desirable for making thermal blankets that are less bulky while still storing sufficient thermal energy for curing. For example, referring to FIG. 11, the pellets 122 can include large pellets 122A and small pellets 122B, the small pellets 122B being smaller than the large pellets and sufficiently small to fit in the interstitial spaces between the large pellets 122A. Two, three or more pellet sizes can be employed to form a multi-modal size distribution for the pellets 122. An example of commercially available pellets is LAB ARMOR® Thermal Beads, which are pure aluminum and are available from Lab Armor LLC of Irving, Texas.

The elastomeric polymer for matrix material 124 can comprise the same materials as those described above for the elastomeric polymer 114, such as silicone that is capable of withstanding temperatures of at least 120° F., such as about 300° F. to about 650° F. or more, have high elongation and be tear resistant. An example of a commercially available silicone is 3145 RTV, available from Dow Corning of Midland, Michigan.

Pellets 122 are incorporated in the matrix material 124 and additional pellets 122 are disposed so as to float freely in a space enclosed on one side by the combination of the thermally transparent layer 118 and the matrix material 124 so as to be sealed within the flexible container 102. The matrix material 124 can thus form a layer proximate the thermally transparent layer 118 and may help to provide a relatively smooth support surface for the pellets 122 disposed above the matrix material 124. Such a smooth surface may be beneficial when curing polymers for providing a smooth cured polymer surface. The combination of pellets and matrix material 124 provide good flexibility for the thermal transfer blanket 100, while the optional plate 120 can increase the thermal energy storage capacity and rigidity of the blanket.

In an example, the one or more plates 120 comprise materials with higher specific heat than the material used for the pellets 122 to increase thermal energy storage. In an example for low temperature cooling or heating applications, the plates 120 can be dry ice or paraffin in the form of blocks. While paraffin wax has a low melting point, it has a heat capacity of 3260 J/kg·K, and thus could store relatively large amounts of thermal energy at colder temperatures compared with, for example, aluminum. For low temperature or high temperature cooling or heating applications, the one or more plates 120 can comprise blocks of organic resins, ceramics or metals that have higher specific heat than the material used for the pellets. As an example, the one or more plates 120 can comprise phenolic resin, which is able to withstand temperatures of 600-700° F. and has a heat capacity of about 1250-1650 J/kg·K.

Figure 8:
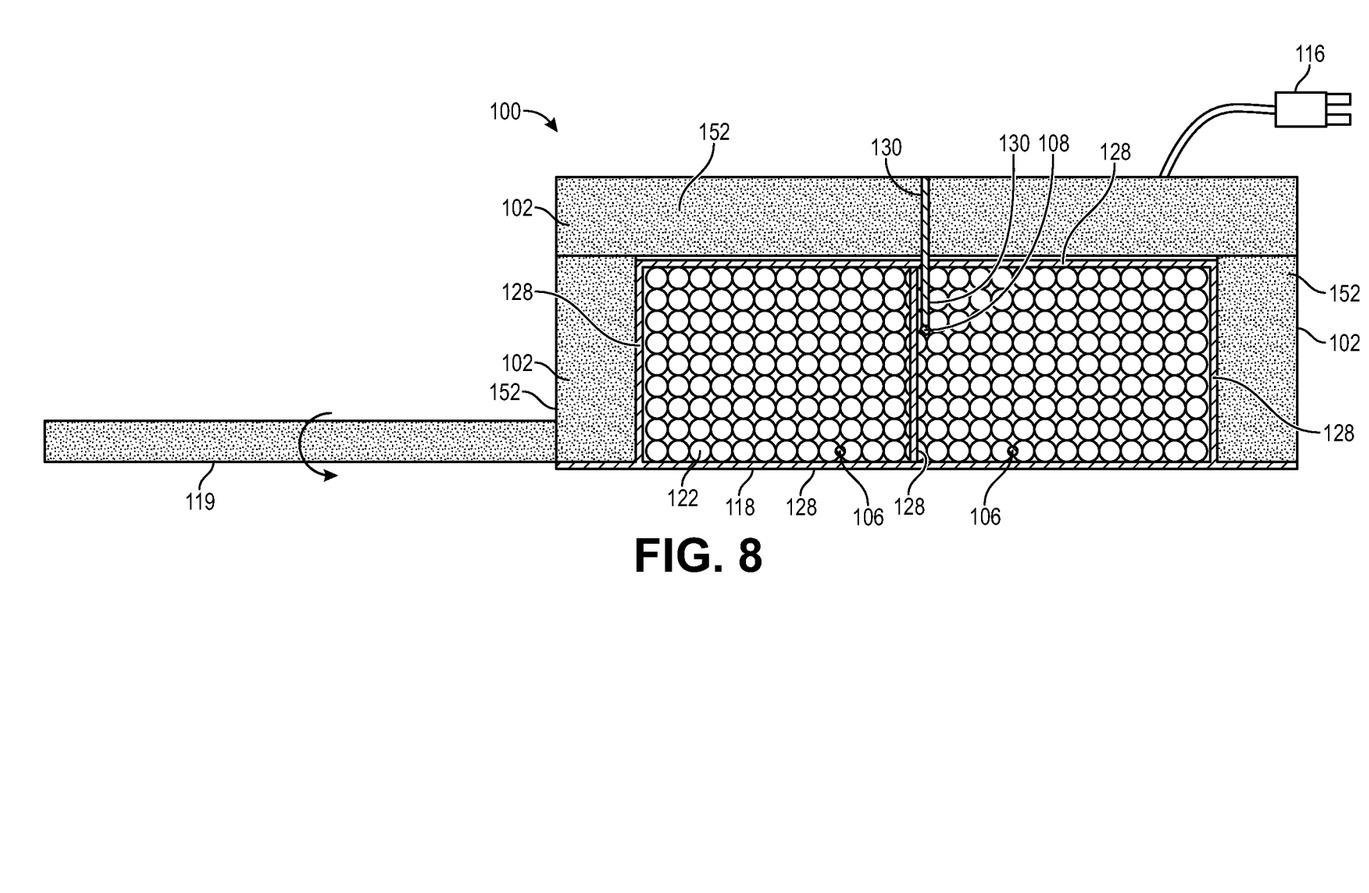
FIG. 8 illustrates a schematic, cross-sectional side view of a thermal transfer blanket, according to an example of the present disclosure.

The thermal transfer blanket 100 of FIG. 8 can be the same as that of FIG. 7, except that the thermal energy storage media 104 does not include a plate 120 or matrix material 124, but instead comprises free floating pellets 122 maintained in the thermal transfer blanket 100 by, for example, containers 128 comprising a fabric. Pellets 122 are made of a material that acts as a heat sink for storing and releasing thermal energy, including any of the materials described herein for pellets 122 in FIG. 7. Containers 128 can include the thermally transparent layer 118 to enclose the pellets 122 within the flexible container 102. The fabric employed for containers 128 can be, for example, a sheet of glass fabric (e.g., fiberglass) capable of withstanding process temperatures of, for example, 120° F. or more, such as about 300° F. to about 650° F. The fabric can be sewn together by any suitable thread, such as glass fibers or a high temperature polymer fiber. An example of a commercially available glass fabric is ARMALON®, which as described above, is a non-porous TEFLON coated fiberglass fabric. Any of the fabrics described herein can optionally employ Teflon or other non-stick coatings. In applications where the blankets are heated above 650° F., the fabric will generally not employ TEFLON. For example, the blanket can be made with S-glass (a woven fiberglass) or from ceramic fibers, such as Nextel 312, 720 or 610, made by 3M of Saint Paul, Minnesota Container 128 can optionally be attached (e.g., stitched or glued) into the flexible container 102 for support.

The thermocouples 106 and 108 can be attached to the fabric of containers 128 (including thermally transparent layer 118) using any suitable technique. One exemplary technique for attached thermocouples 106 is to bond them to the thermally transparent layer 118 using a high temperature adhesive, such as silicone (e.g., 3145 RTV available from Dow Corning of Midland, Michigan). In cases where thermally transparent layer 118 includes a non-stick coating, such as PTFE (e.g., TEFLON), the non-stick coating can first be removed from the location where the one or more thermocouples 106 are to be bonded using any suitable technique, such as, for example, a tetra etch, as is generally well known in the art. The one or more thermocouples 106 are then attached to the thermally transparent layer 118. The one or more thermocouples 108 can be attached to, for example, a place holder 130 that is attached to the container 128. The place holder can be, for example, a piece of fabric or other material attached to the container 128 by stitching, so that the thermocouple 108 is maintained in a desired position in the pellets 122 that are free floating in container 128.

Figure 9:
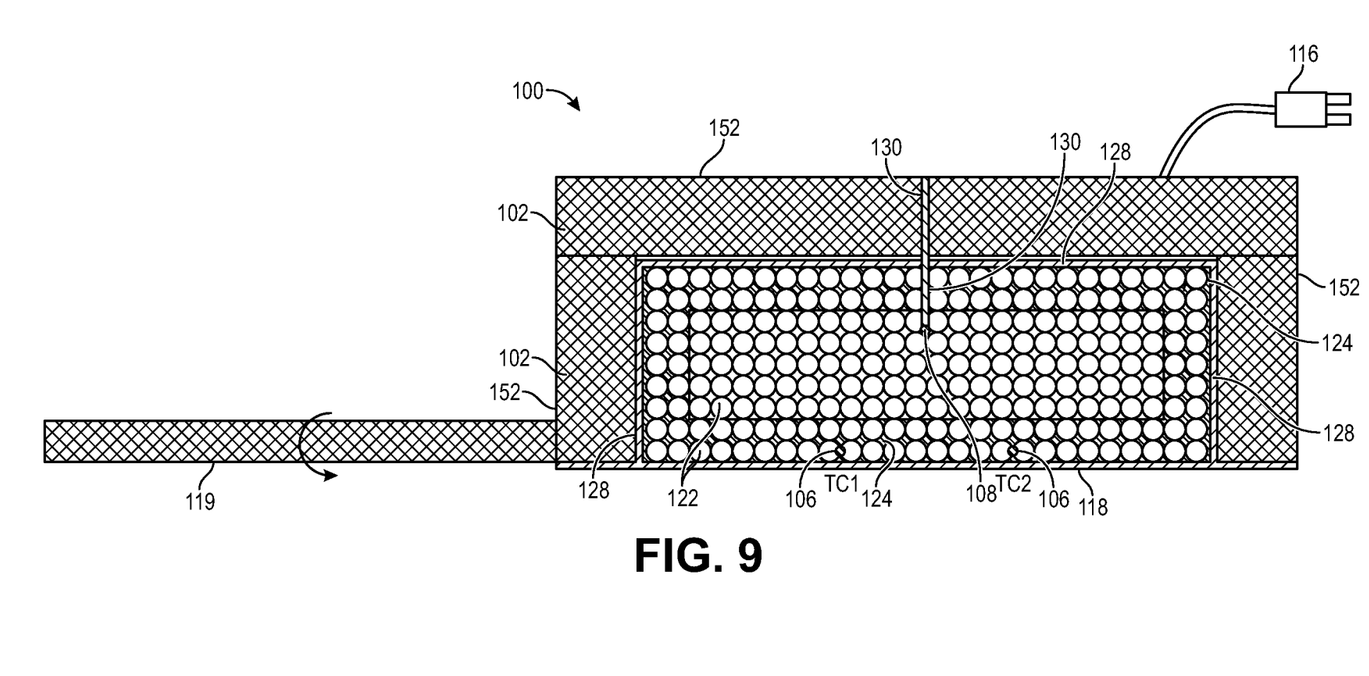
FIG. 9 illustrates a schematic, cross-sectional side view of a thermal transfer blanket, according to an example of the present disclosure.

The thermal transfer blanket 100 of FIG. 9 can be the same as that of FIG. 7, except that the thermal energy storage media 104 does not include a plate 120, but instead comprises a combination of free floating pellets 122 surrounded by additional pellets 122 in the matrix material 124. The matrix material 124 may help to provide a relatively smooth support surface for containing the pellets 122. Such a smooth surface may be beneficial when curing polymers for providing a smooth cured polymer surface. The combination of pellets and matrix material 124 provide good flexibility for the thermal transfer blanket 100. The matrix material 124 comprises an elastomeric polymer, as described herein. At least a portion of a perimeter of the pellets are in the matrix material 124. For example, the free floating pellets can be entirely surrounded so as to be contained by the matrix material 124, as shown in FIG. 9. Pellets 122 are made of a material that acts as a heat sink for storing and releasing thermal energy, including any of the materials described herein for pellets 122 in FIG. 7. The pellets 122 are maintained in the thermal transfer blanket 100 by, for example, a container 128 comprising a fabric that is capable of withstanding process temperatures. Container 128 can optionally be attached (e.g., stitched or glued) into the flexible container 102 for support. The container 128 can include the thermally transparent layer 118 to enclose the pellets 122 within the flexible container 102. The fabric employed for container 128 can be, for example, a sheet of glass fabric (e.g., fiberglass). The fabric can be sown together by any suitable thread, such as glass fibers or a high temperature polymer fiber. Any of the fabrics described herein can optionally employ Teflon or other non-stick coatings, which may be useful when curing resins, as an example. An example of a commercially available glass fabric is ARMALON®, which as described above, is a non-porous TEFLON coated fiberglass fabric. In applications with process temperatures over 650° F., the fabric will generally not employ TEFLON. For example, the fabric can be made with S-glass (a woven fiberglass) or from ceramic fibers, such as Nextel 312, 720 or 610, made by 3M of Saint Paul, Minnesota. The thermocouple 108 can be attached to, for example, a place holder 130, such as a piece of fabric or other material, by any suitable means, such as stitching or use of an adhesive, so that the thermocouple 108 is maintained in a desired position in the pellets 122 that are free floating. The matrix material 124 can be positioned proximate to the container 128 and thermally transparent layer 118 so as to completely or partially enclose the pellets 122 that are free floating.

Figure 10:
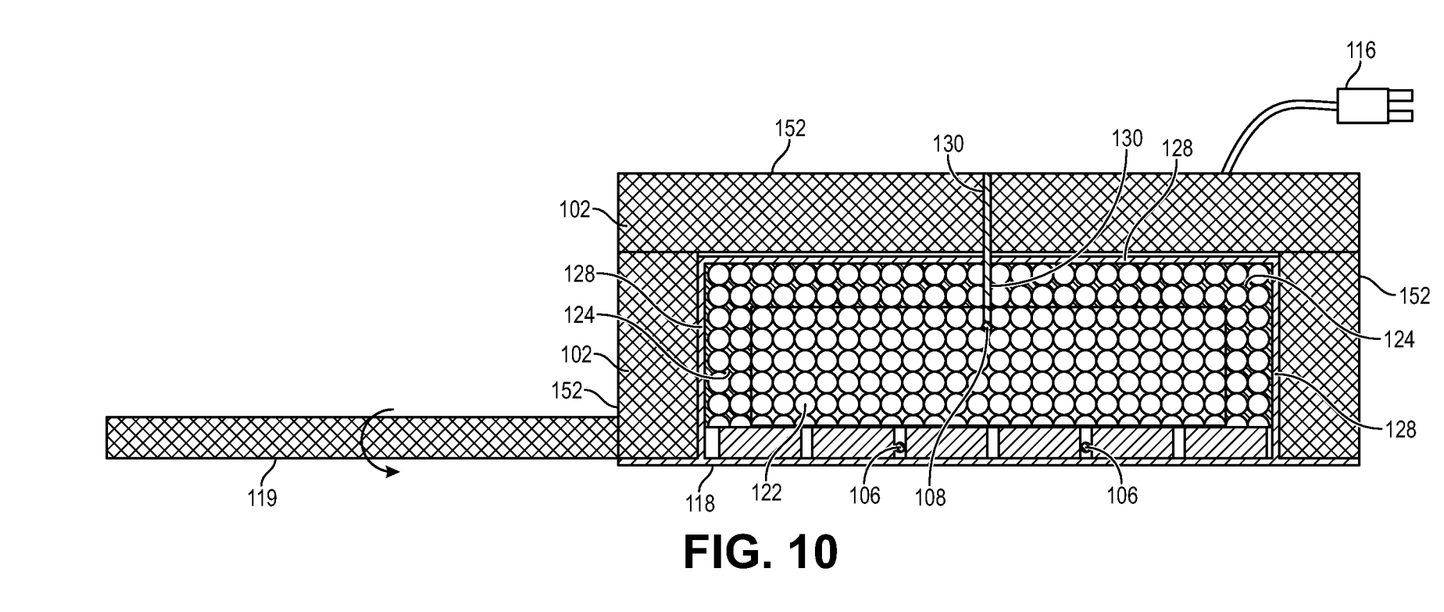
FIG. 10 illustrates a schematic, cross-sectional side view of a thermal transfer blanket, according to an example of the present disclosure.

The thermal transfer blanket 100 of FIG. 10 can be the same as that of FIG. 9, except that a portion of the matrix material 124 positioned proximate to the thermally transparent layer 118 is replaced with at least one layer 110 of tiles 112. The at least one layer 110 of tiles 112 is disposed between the pellets 122 and the thermally transparent layer 118. Alternatively, if layer 118 is not employed, layer 110 can provide an outer surface for contacting an object to be heated or cooled. The tiles 112 in each layer 110 are spaced apart and bonded together by an elastomeric polymer 114, the same as described above with respect to FIG. 2. The tiles 112 and elastomeric polymer 114 can comprise any of the materials described herein for tiles 112 and elastomeric polymer 114. In an example, the tiles comprise aluminum, such as pure aluminum or an aluminum alloy. The use of the layer 110 can increase the packing density of the thermal energy storage media 104 compared with the pellets 122, which can in turn increase the thermal conductivity of the thermal energy storage media 104.

Figure 12:
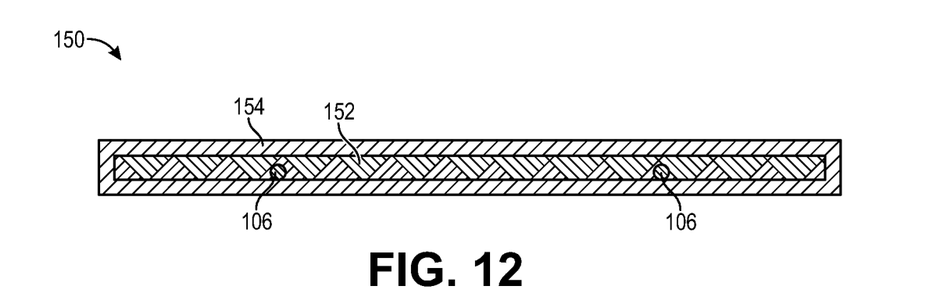
FIG. 12 illustrates a schematic, cross-sectional side view of a thermal resistive pad, according to an example of the present disclosure.
Figure 13:
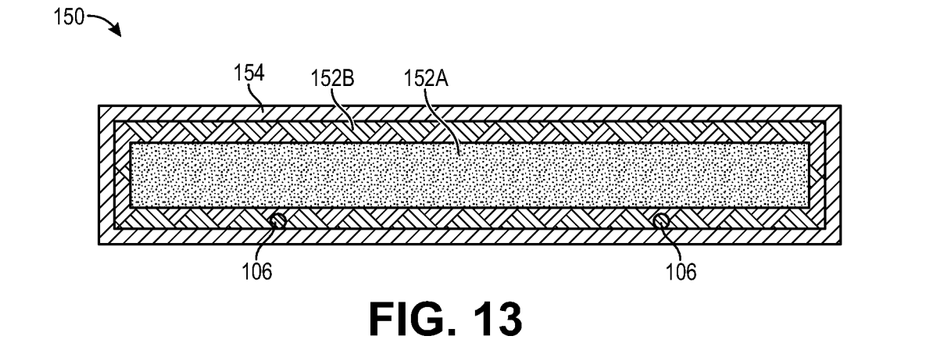
FIG. 13 illustrates a schematic, cross-sectional side view of a thermal resistive pad, according to an example of the present disclosure.
Figure 14:
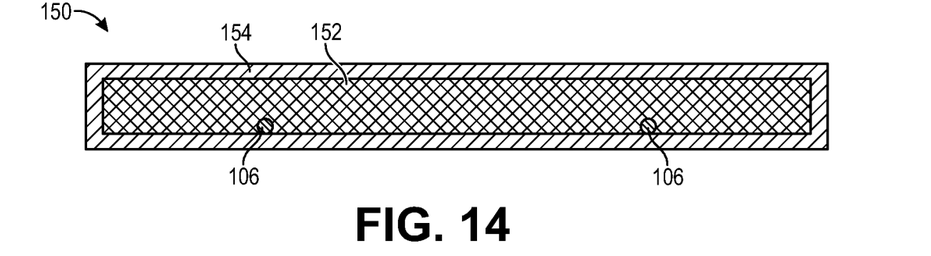
FIG. 14 illustrates a schematic, cross-sectional side view of a thermal resistive pad, according to an example of the present disclosure.

FIGS. 12 to 14 illustrate thermal resistive pads 150 that can be employed with any of the thermal transfer blankets described herein. Examples of how the thermal resistive pads 150 are used in relation to the thermal transfer blankets are discussed in more detail with respect to FIG. 15 below. The thermal resistive pads 150 comprise a thermal insulating material 152 and a shell layer 154 surrounding the thermal insulating material 152. As an example, the thermal insulating material 152 comprises a material chosen from a fabric comprising glass, a ceramic batting, a foam, and combinations thereof. The particular insulating material 152 or combination of materials that are employed will depend on the degree of thermal insulation desired and the temperatures the thermal resistive pad 150 will be exposed to, among other things. For example, the fabric comprising glass can be employed when relatively small amounts of thermal insulation are desired in order to provide increased heat transfer, while the ceramic batting an foam can be employed when relatively large amounts of thermal insulation are desired in order to provide reduced heat transfer compared to the heat transfer that would be achieved when employing the fabric comprising glass. If desired, one or more layers of fabric comprising glass can be employed in combination with the foam or ceramic batting to achieve still larger amounts of thermal insulation to provide reduced heat transfer compared to the heat transfer that would be achieved when employing either the foam or ceramic batting without the additional layer of fabric comprising glass. FIG. 12 illustrates an example of a thermal resistive pad 150 wherein the thermal insulating material 152 is a fabric comprising glass, such as fiberglass. The shell layer 154 in FIG. 12 comprises a fabric comprising glass, such as fiberglass, optionally coated with a non-stick coating. The a non-stick coating can be a fluoropolymer, for example, polytetrafluoroethylene (e.g., TEFLON). An example of a commercially available fabric for shell layer 154 is ARMA-LON®, which is a non-porous TEFLON coated fiberglass. In applications with process temperatures over 650° F., the fabric will generally not employ TEFLON. For example, the fabric can be made with S-glass (a woven fiberglass) or from ceramic fibers, such as Nextel 312, 720 or 610, made by 3M of Saint Paul, Minnesota. The shell layer 154 can withstand temperatures of at least 120° F., such as about 300° F. to about 650° F. or higher. Thermocouples 106 can optionally be arranged in the pads if desired, as shown in FIGS. 12 to 15. For example, one or more thermocouples 106 can be positioned proximate an outer surface of the thermal resistive pads 150.

FIG. 13 illustrates an example of a thermal resistive pad 150 wherein the thermal insulating material 152 comprises a ceramic batting 152A, such as alumina batting, and a layer of fabric 1526 comprising glass, such as fiberglass, that surrounds the ceramic batting 152A. The layer of fabric 1526 is a separate layer from the shell layer 154 and can be employed to contain the ceramic batting 152A independently of the shell layer 154 (e.g., in the event the shell layer 154 is removed), as well as to provide additional thermal insulation as described above. The layer of fabric 1526 can be the same or a different material as the shell layer 154. In an example, the shell layer 154 can be the same as that described above for FIG. 12.

FIG. 14 illustrates an example of a thermal resistive pad 150 wherein the thermal insulating material 152 comprises a foam, such as silicone foam. The shell layer 154 can be the same as that described above for FIG. 12.

The thermal resistive pad 150 can be employed as a stand-alone pad that is separate from the thermal transfer blankets described herein. Alternatively, at least one thermal resistive pad 150 can be attached to the thermal transfer blanket 100. For example, one or more of the thermal resistive pads 150 can be attached to the flexible container 102 of any of the thermal transfer blankets 100, either in place of, or in addition to, the heat storage flap 119. In an example, the heat storage flap 119 comprises at least one thermal resistive pad 150, such as 2 to 4 of any of the thermal resistive pads 150 of FIG. 12, 13 or 14, or any combination thereof.

The thermal resistive pads 150 can be made of any number of flexible insulating materials and can be stacked between the thermal transfer blankets and a repair patch to reduce the thermal transfer rate. When the thermal storage device is fully charged it may too hot (or cold) and a particular thermal energy transfer rate maybe desired. A thermal resistive pad or pads can be placed between the thermal transfer blanket and the repair patch to reducing thermal energy transfer rate. During heating or cooling, thermal resistive pads can be added or removed to maintain the heating rate as the thermal transfer blanket is depleted, or to speed up the heating rate or limit the repair to a maximum temperature. Thermal couples on the thermal resistive pads and the thermal transfer blanket can be monitored and/or data recorded with a battery operated handheld device to facilitate proper cure repair.

FIG. 15 illustrates a method of using the thermal transfer blankets of the present disclosure. In particular, FIG. 15 shows a thermal transfer blanket 100 similar to that of FIG. 10 being used to heat a thermally curable patch 200 for repairing an object 210 comprising a composite material. An example of a patch 200 may comprise one or more plies of a fibrous material pre-impregnated with a resin (referred to herein as prepreg plies 202). One or more filler plies 204 can optionally be employed with the prepreg plies 202 as part of the patch 200, as is well known in the art. An adhesive film 214 can be applied to the surface of the object 210 between the object 210 and the patch 200. Scarfing, or taper sanding, of the damaged composite surface may be carried out prior to application of the patch, as is well known in the art, so as to provide adequate load transfer between the patch and the composite when the repair patch is bonded to the composite. The thermal transfer blanket 100 is charged with thermal energy and then positioned on the patch 200 to provide sufficient thermal energy for curing. One or more thermal resistive pads 150 can optionally be applied between the thermal transfer blanket 100 and the patch 200 if a reduced temperature (compared to the temperature of the thermal energy storage media 104) is desired at the surface of the patch 200. As the thermal energy storage media 104 of the thermal transfer blanket cools, the thermal resistive pads 150 can incrementally be removed over time to maintain a desired temperature at the surface of the patch 200. After curing is complete, the thermal transfer blanket 100 and optional thermal resistive pads can be removed from the patch 200.

The thermal transfer blankets of the present application can be used for various heating or cooling applications.

Examples of such applications include: curing any kind of organic resin or cements, even in cold environments; accelerating the cure of organic composites for repairs for aircraft, cars, motorcycles, bikes or sporting goods; keeping items hot or cold for storage or shipping without melting or release of any liquid, such as water from ice.

Example

A plate of aluminum about ½" thick was put in an oven at 350° F. to absorb the heat. The hot plate was placed on top of a piece of frozen prepreg (which specified a cure temperature greater than about 250° F. for at least about 90 min. for curing). A layer of ARMALON and woven glass fabric (acting as a thermal resistive pad) was positioned between the prepreg and the heated aluminum. The heat from the aluminum cured the prepreg.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A thermal transfer blanket, comprising:
a flexible container comprising a thermally insulating material; and
a thermal energy storage media configured to act as a heat sink for storing and releasing thermal energy and disposed within the flexible container,
wherein the thermal transfer blanket is non-powered;
wherein the thermally insulating material can withstand process temperatures of 300° F. or more; and
wherein the thermal energy storage media comprises a metal oxide, non-oxide ceramic, or a metal and has a thermal conductivity of 35 W/m-K or more at 25° C.

2. The thermal transfer blanket of claim 1, further comprising a thermally transparent layer in direct thermal communication with the thermal energy storage media.

3. The thermal transfer blanket of claim 2, wherein the thermally transparent layer comprises fiberglass coated with a fluoropolymer.

4. The thermal transfer blanket of claim 1, further comprising a thermocouple in thermal communication with the thermal energy storage media.

5. The thermal transfer blanket of claim 1, wherein the thermally insulating material comprises a ceramic batting and a layer of fabric comprising glass that surrounds the ceramic batting.

6. The thermal transfer blanket of claim 1, wherein the thermally insulating material comprises foam insulation.

7. The thermal transfer blanket of claim 1, wherein the thermal energy storage media comprises at least one material chosen from AlN, BeO, BN, diamond, $Al_2O_3$, and a metal, and wherein the thermal energy storage media has a specific heat capacity of 300 J/kg·K or more at 25° C.

8. The thermal transfer blanket of claim 7, wherein thermal energy storage media is pure aluminum.

9. The thermal transfer blanket of claim 1, wherein the thermal energy storage media comprises one or more layers of tiles, the tiles in each layer being bonded together by an elastomeric polymer.

10. The thermal transfer blanket of claim 9, wherein the thermal energy storage media comprises 2 to 10 layers of the tiles, the 2 to 10 layers of the tiles comprising at least one layer having tiles of a first length and at least one layer having tiles of a second length that is longer than the first length.

11. The thermal transfer blanket of claim 1, wherein the thermal energy storage media comprises pellets.

12. The thermal transfer blanket of claim 11, wherein at least a portion of the pellets are in a matrix material comprising an elastomeric polymer.

13. The thermal transfer blanket of claim 11, wherein the pellets comprise large pellets and small pellets, the large pellets having interstitial spaces therebetween and the small pellet being sufficiently small to fit in the interstitial spaces between the large pellets.

14. The thermal transfer blanket of claim 11, wherein the thermal energy storage media further comprises at least one plate comprising metal.

15. The thermal transfer blanket of claim 1, further comprising a heat storage flap attached to the flexible container.

16. The thermal transfer blanket of claim 15, wherein the heat storage flap comprises at least one thermal resistive pad.

17. A thermal transfer blanket system, comprising:
a thermal transfer blanket, comprising:
a flexible container comprising a thermally insulating material; and
a thermal energy storage media configured to act as a heat sink for storing and releasing thermal energy and disposed within the flexible container,
wherein the thermal transfer blanket is non-powered;
wherein the thermally insulating material can withstand process temperatures of 300° F. or more; and
wherein the thermal energy storage media comprises a metal oxide, non-oxide ceramic, or a metal and has a thermal conductivity from about 100 W/m-K to about 500 W/m-K and a specific heat capacity from about 300 J/kg·K to about 1500 J/kg·K at 25° C., and
a thermal resistive pad, stacked on the thermal transfer blanket, comprising:
a thermal insulating material;
a shell layer surrounding the thermal insulating material, the shell layer being a fabric; and
a thermocouple proximate the shell layer,
wherein the shell layer can withstand temperatures of at least 120° F., and
wherein the thermal resistive pad is configured to at least partially reduce a thermal energy transfer rate for the thermal transfer blanket.

18. The thermal transfer blanket system of claim 17, wherein the thermal insulating material comprises a material chosen from a fabric comprising glass, a ceramic batting, a foam, and combinations thereof.

19. The thermal transfer blanket system of claim 17, wherein the fabric of the shell layer comprises a non-stick coating.

20. A thermal transfer blanket system, comprising:
- a thermal transfer blanket, comprising:
  - a flexible container comprising a thermally insulating material; and
  - a thermal energy storage media disposed within the flexible container,
  - wherein the thermal transfer blanket is non-powered;
  - wherein the thermally insulating material can withstand process temperatures of 300° F. or more; and
  - wherein the thermal energy storage media has a thermal conductivity of 35 W/m-K or more at 25° C., and a specific heat capacity of about 300 J/kg·K or more at 25° C., and one or more thermal resistive pad, comprising:
  - a thermal insulating material;
  - a shell layer surrounding the thermal insulating material, the shell layer being a fabric; and
  - a thermocouple proximate the shell layer,
  - wherein the shell layer can withstand temperatures of at least 120° F.,
- wherein the one or more thermal resistive pad is applied to the thermal transfer blanket to reduce a temperature transferred by the thermal transfer blanket.

* * * * *